United States Patent [19]

Umemura et al.

[11] 4,035,263

[45] July 12, 1977

[54] COMPOSITE CATALYST FOR CLARIFYING EXHAUST GAS CONTAINING NITROGEN OXIDES AND METHOD FOR PRODUCING THE SAME

[75] Inventors: Sumio Umemura; Hisayuki Mizuno; Tohru Ogawa, all of Ube, Japan

[73] Assignee: UBE Industries, Ltd., Ube, Japan

[21] Appl. No.: 659,201

[22] Filed: Feb. 19, 1976

[30] Foreign Application Priority Data

Mar. 26, 1975  Japan .................. 50-35378

[51] Int. Cl.$^2$ .................. B01J 29/10; B01J 29/20
[52] U.S. Cl. .................. 252/459; 252/454; 252/455 R; 423/239
[58] Field of Search .............. 252/454, 459, 455 R; 423/239

[56] References Cited

U.S. PATENT DOCUMENTS

| | | | |
|---|---|---|---|
| 3,544,264 | 12/1970 | Hardison | 423/239 X |
| 3,552,913 | 1/1971 | Stephens | 423/239 X |
| 3,806,582 | 4/1974 | Keith et al. | 423/239 |
| 3,842,158 | 10/1974 | Hansford | 423/239 X |

*Primary Examiner*—Carl F. Dees
*Attorney, Agent, or Firm*—Austin R. Miller

[57] ABSTRACT

A composite catalyst which is capable of clarifying exhaust gas containing nitrogen oxides therein with a high effectiveness over a long period of time while producing no or a very small amount of undesirable by-products such as ammonia, which comprises a catalytic ingredient comprising oxides of nickel and copper in an atomic ratio of nickel to copper of 1:0.05 through 1 and a catalytic base comprising a refractory inorganic material containing at least 50% by weight of zircon therein, said catalytic ingredient being carried on said catalytic base.

15 Claims, No Drawings

COMPOSITE CATALYST FOR CLARIFYING EXHAUST GAS CONTAINING NITROGEN OXIDES AND METHOD FOR PRODUCING THE SAME

The present invention relates to a composite catalyst for clarifying exhaust gas containing nitrogen oxides, and a method for producing the same. More particularly, the present invention relates to a composite catalyst for clarifying exhaust gas containing nitrogen oxides, having a high resistance to deactivation by catalyst-poisonous sulphur and sulphur compounds, and a method for producing the same.

Recently, a large amount of nitrogen oxides ($NO_x$) is exhausted from internal combustion engines, steam-power plants, kilns for producing cement, combustion furnaces and factories for producing nitric acid or nitrates. The nitrogen oxides thus generated cause pollution of the atmosphere. Accordingly, it is desired to clarify the exhaust gases containing nitrogen oxides by converting them into harmless substances by means of a simple method.

A large number of attempts has been made to obtain a catalyst useful for reducing nitrogen oxides in the exhaust gas from internal combustion engines, stationary burning apparatus and the chemical industry into harmless gas, with a reducing agent, for example, carbon monoxide (CO), hydrogen ($H_2$), hydrocarbons (HC) and ammonia ($NH_3$). From this point of view of industrial utilization, it is important that the catalyst be capable of maintaining its catalytic activity at a high level over a long period of time. That is, it is desired that the industrial catalyst has a high resistance to deactivation due to catalyst-poisonous substances, for example, sulphur and sulphur compounds, in the exhaust gas, and a long catalytic acitivity life. Further, it is desired that the industrial catalyst can clarify the exhaust gas while generating no or only a very small amount of undesirable by-products, for example, ammonia. However, there are only a few catalysts which industrially satisfy the above-mentioned desires. For example, although catalytic noble metals, for example, platinum, are effective for reducing nitrogen oxides, they are expensive and have a tendency to be easily deactivated by the catalyst-poisonous sulphur and to generate a large amount of ammonia as a by-product. It is known that some catalysts comprising non-noble metal compounds are cheap and have a tendency to generate only a very small amount of ammonia. However, these catalysts have a relatively short catalytic activity life, because they are easily poisoned by sulphur or sulphur compounds. For example, it is known that a catalyst which comprises oxides of nickel and copper carried on a catalytic base consisting of a refractory inorganic oxide material selected from the group consisting of alumina, silica-alumina, mullite, cordierite, magnesia, silica and zirconia, is effective for reducing nitrogen oxides in the exhaust gas. It is definite that the above-mentioned type of catalyst is industrially effective over a long period of time, only when used for clarifying the exhaust gas containing no sulphur or sulphur compound, for example, sulphur dioxide. However, with this type of catalyst there is a definite tendency for the catalytic activity for removing nitrogen oxides from the exhaust gas to decrease as the content of the catalyst-poisonous sulphur or sulphur compound in the exhaust gas increases.

In the recent past, the inventors discovered that catalysts consisting of oxides of nickel and copper and the above-specified catalytic base could maintain their catalytic activity at a high level over a relatively long period of time, when an atomic ratio of nickel to copper in the catalyst is limited to a special range of 1:0.05 through 1. It was found that this was true even if the exhaust gas contained catalyst-poisonous sulphur or sulphur compounds therein. However, it was also found that this type of catalyst has an undesirable tendency to decrease its catalytic activity to 70 to 80%, based on the initial activity thereof, about 300 hours after the catalyst is brought into contact with the exhaust gas from an internal combustion engine of an automobile. That is, the catalyst is not satisfactory from the point of view of industrial utilization.

An object of the present invention is to provide a composite catalyst for clarifying exhaust gas containing nitrogen oxides, which catalyst has a long life of catalytic activity even if the exhaust gas contains catalyst-poisonous sulphur and sulphur compounds therein, and a method for producing the same.

Another object of the present invention is to provide a composite catalyst for clarifying exhaust gas by reducing nitrogen oxides therein with a high effectiveness, and a method for producing the same.

A further object of the present invention is to provide a composite catalyst for clarifying exhaust gas containing nitrogen oxides while generating undesirable by-products such as ammonia in no or a very small amount.

The above-mentioned objects can be accomplished by the composite catalyst of the present invention, which comprises a catalytic ingredient comprising oxides of nickel and copper in an atomic ratio of nickel to copper of 1:0.05 through 1, and a catalytic base which carries said catalytic ingredient thereon and comprises a refractory inorganic material containing at least 50% by weight of zircon therein.

In the composite catalyst of the present invention, it is important that the catalytic base comprises a refractory inorganic material containing at least 50% by weight of zircon ($ZrSiO_4$). That is, the catalyst base may consist essentially of zircon, or may consist of at least 50% by weight of zircon and at most 50% by weight of a refractory inorganic material other than zircon. The refractory inorganic material may be a refractory inorganic oxide material, for example, cordierite, mullite, magnesia, alumina, silica-alumina, silica, zirconia and a mixture of two or more of the above-mentioned materials. The zircon usable for the present invention may be either natural or artificial.

A preferable embodiment of the catalytic base usable for the present invention, comprises 70 to 90% by weight of zircon and the balance consisting of a refractory inorganic oxide material selected from the group consisting of cordierite, mullite, magnesia, silica-alumina and a mixture of two or more of the above-mentioned materials. The above-mentioned type of the catalytic base has an advantage of a higher capability of maintaining its mechanical tenacity without decreasing it lower than that of the catalytic base consisting essentially of zircon, even when the catalytic base is repeatedly subjected to alternate thermal expansion at an elevated temperature and to thermal shrinking at a decreased temperature.

In the composite catalyst of the present invention, there is no limitation with regard to the amount of the catalytic ingredient comprising the oxides of nickel and copper. However, it is preferable that this catalytic ingredient be present in an amount of 4 to 50% by weight in the composite catalyst.

The composite catalyst of the present invention has no limitation with regard to its form. That is, the composite catalyst may be in the form of powder, grains, granules, pellets, tablets, monoliths, hollow blocks, porous lumps, or honeycombs.

The composite catalyst of the present invention is produced by the method of the present invention, which comprises depositing at least one nickel compound selected from the group consisting of salts and hydroxides of nickel and at least one copper compound selected from the group consisting of salts and hydroxides of copper in an atomic ratio of nickel to copper of 1:0.05 through 1, onto a catalytic base comprising a refractory inorganic material containing at least 50% by weight of zircon, thereof, and; converting said nickel and copper compounds into the corresponding oxides, respectively, by calcining these compounds together with said catalytic base at a temperature of 400° to 1,000° C.

The depositing operation may be effected by impregnating the catalytic base with an aqueous solution containing the nickel compound and the copper compound and drying the impregnated catalytic base with the aqueous solution so as to deposit the nickel and copper compounds onto the catalytic base. The impregnation mentioned above may be carried out by immersing the catalytic base into the aqueous solution or by spraying the aqueous solution onto the catalytic base. The aqueous solution preferably contains 30 to 70% by weight of the sum of the nickel and copper compounds therein. There is no limitation with regard to the drying temperature. However, the preferable temperature for the drying operation is in a range of from 100° to 300° C.

The impregnated catalytic base with the aqueous solution is calcined at a temperature within a range of from 400° to 1,000° C, preferably, from 500° to 800° C, in order to convert the nickel and copper compounds into the corresponding oxides, respectively. There is no limitation with regard to the calcining time as long as the conversion is completed. However, it is preferable that the calcining operation be carried out for 1 to 5 hours.

The nickel salts usable for the preparation of the composite catalyst may be selected from the group consisting of carbonates, nitrates, sulfates, chlorides, formates, acetates, propionates, and oxalates of nickel. The copper salt usable for the preparation of the composite catalyst may be selected from the group consisting of carbonates, nitrates, sulfates, chlorides formates, acetates, propionates, and oxalates of copper. These salts of nickel and copper may be directly applied to the catalytic base, or may be preliminarily converted into the corresponding hydroxides and, then, applied to the catalytic base.

The nickel compound and the copper compound may be simultaneously deposited onto the catalytic base by impregnating the catalytic base with an aqueous solution containing both the nickel compounds and the copper compounds. If this is the case, the calcination for the impregnated catalytic base with both the nickel and copper compounds cna be effected in one operation. Otherwise, the deposit operation and the calcining operation for the nickel compound may be carried out separately from those for the copper operation.

The composite catalyst of the present invention may be prepared by mixing oxides of nickel and copper in the form of powder with the catalytic base. The mixture, prepared above, may be shaped into a desired shape and calcined at a temperature of 400° to 1,000° C, if desired.

The above-mentioned composite catalyst of the present invention is effective for reducing nitrogen oxides in an exhaust gas atmosphere containing a reducing gas, for example, carbon monoxide, hydrogen, hydrocarbon and ammonia, with a high efficiency. In the utilization of the composite catalyst, the exhaust gas to be clarified is brought into contact with the composite catalyst at a temperature of 300° to 800° C, preferably, 500° to 700° C, for a time long sufficient enough to reduce the nitrogen oxides with desired efficiency.

The composite catalyst of the present invention can maintain its catalytic activity at a high level even if the exhaust gas to be clarified contains catalyst-poisonous sulphur and sulphur compound, for example, sulphur dioxide. Further, the composite catalyst of this invention can remove nitrogen oxides with high efficiency while generating no or only a very small amount of ammonia as a by-product. Accordingly, the composite catalyst of the present invention is extremely useful for clarifying exhaust gas containing a catalyst-poisonous sulphur compound, such as sulphur dioxide, from internal combustion engines and stationary burning apparatus.

The present invention will be further illustrated by the examples herein below, which are presented for the purpose of illustrations only and not as limitations of the scope of the present invention. In the examples and comparison examples, the test of clarification of exhaust gas containing nitrogen oxides was carried out by the following procedures.

Four composite catalysts were prepared by depositing the catalytic ingredient onto four cylindrical honeycomb-shaped catalytic bases, each having a cross-sectional diameter of 90 mm, a length of 75 mm and a open frontal area of 70%. The composite catalysts were inserted into a muffler. The resultant catalyst muffler was connected to an exhaust pipe of the gasoline internal combustion engine of an automobile having a total displacement of 1800 ml and a maximum speed of 6,000 r.p.m.. The engine was subjected to a 2.5 hour running test using an unleaded gasoline produced by Nippon Oil Co., Japan. The running test included the following seven steps.

1. Idling for 20 minutes.
2. First running for 30 minutes at a speed one-third of the maximum speed of the engine under a load three-fourths of the maximum load of the engine.
3. Second running at a speed corresponding to a vehicle speed of 40 km/hr under a load under which the engine is loaded to run on a level road.
4. Third running for 20 minutes under the same conditions as in the Second running with the exception that at an entrance of the catalyst muffler, air in an amount corresponding to 30% in volume of exhaust gas from the catalyst maffler was mixed with the exhaust gas.
5. Fourth running for 20 minutes at a speed two-thirds of the maximum speed of the engine under a load three-fourths of the maximum load of the engine.

6. Fifth running for 20 minutes at a speed corresponding to a vehicle speed of 100 km/hr under a load under which the engine is loaded to run on a level road.

7. Sixth running for 20 minutes at a speed one-third of the maximum speed of the engine under a load two-fourths of the maximum load of the engine.

The above running test was successively repeated for a predetermined number of times. After the completion of the above running test, the engine was run at a speed of 2,500 r.p.m. under a boost pressure of 250 mmHg and the resultant exhaust gas was subjected to the determinations of the percentage of elimination of nitrogen monoxide and of the selectivity percentage of conversion of nitrogen oxides in the exhaust gas into ammonia.

In the above determination procedures, concentrations of nitrogen monoxide in the exhaust gas at an entrance and an exit of the catalyst muffler were determined by using a chemical luminescence-type analyser for nitrogen oxides (Trademark: CLA-11) made by Horiba Seisakusho, Japan. Provided $C_1$ and $C_2$ represent the concentrations of nitrogen monoxide in the exhaust gas at the entrance and at the exit of the catalyst muffler, respectively, the elimination percentage of nitrogen monoxide is calculated in accordance to the following equation (I).

$$\text{Elimination percentage of nitrogen monoxide} = [(C_1 - C_2)/C_1] \times 100 \quad \text{(I)}$$

Also, the determination of the selectivity percentage of ammonia was carried out by the following procedures. In order to determine the amount of ammonia produced as a by-product of the reduction of nitrogen oxides, the exhaust gas discharged through an exit of the catalyst muffler was introduced into water so as to dissolve ammonia in the exhaust gas into the water. The amount of ammonia thus dissolved into the water was determined by using an ion meter (Trademark: Ion meter Model 407) made by Orion Research Inc., U.S.A.. The selectivity percentage of ammonia was calculated in accordance with the equation (II).

$$\text{Selectivity percentage of ammonia} = (C_3/C_1) \times 100 \quad \text{(II)}$$

wherein $C_1$ represents the same as mentioned above, and $C_3$ represents a concentration of ammonia in the exhaust gas at the exit of the catalyst muffler.

EXAMPLE 1

An aqueous solution of nickel nitrate and copper nitrate was prepared in such a manner that the atomic ratio of nickel to copper was 1:0.25. The aqueous solution was applied to a cylindrical honeycomb-shaped catalyst base consisting essentially of zircon so that the catalyst base was impregnated with 8%, based on the weight of the catalyst base, of the nickel and copper compounds calculated in terms of NiO and CuO. The calalyst base containing the aqueous solution was dried at a temperature of 110° C and the dried composite catalyst was calcined at a temperature of 500° C for 3 hours in atmospheric air. The composite catalyst thus obtained was subjected to the engine-running test as stated hereinbefore. The elimination percentage of nitrogen monoxide and the selectivity percentage of ammonia were determined after the completion of the engine-running test for a predetermined period of time of from 5 to 830 hours. The results are indicated in Table 1. As is obvious from the Table, the composite catalyst of Example 1 has a very long life of catalytic activity.

EXAMPLE 2

Procedures identical to those in Example 1 were carried out, except that the cylindrical honeycomb-shaped catalytic base consisted of 80% by weight of zircon and the balance of cordierite. The results are indicated in Table 1. As the table clearly shows, the composite catalyst of Example 2 has a long life of catalytic activity.

Comparison Example 1

Procedures identical to those in Example 1 were repeated, except that the cylindrical honeycomb-shaped catalyst base was made of mullite. The results are indicated in Table 1. The table clearly shows that the composite catalyst of Comparison Example 1 had a poorer durability in the catalytic activity than the composite catalysts of Examples 1 and 2.

Comparison Example 2

Procedures identical to those in Example 1 were carried out, except that the cylindrical honeycomb-shaped catalytic base was made of cordierite. The results are indicated in Table 1. The table definitely shows that the composite catalyst of the Comparison Example 2 had a poor durability in the catalytic activity than the composite catalyst of Example 1 and 2.

Table 1

| Example No. | Catalytic base material | Property (%) | Engine-running time (hr) | | | | | | | |
|---|---|---|---|---|---|---|---|---|---|---|
| | | | 5 | 50 | 100 | 200 | 300 | 500 | 700 | 830 |
| Example 1 | zircon | NO— Elimination[*1] | 96 | 93 | 93 | 91 | 91 | 89 | 88 | 86 |
| | | $NH_3$— Selectivity[*2] | 6 | 5 | 5 | 4 | 3 | 4 | 3 | 3 |
| Example 2 | 80% zircon | NO— Elimination | 97 | 94 | 91 | 89 | 88 | 88 | 85 | 82 |
| | 20% cordierite | $NH_3$— 6 Selectivity | 6 | 5 | 5 | 3 | 3 | 3 | 3 | |
| Comparison Example 1 | Mullite | NO— Elimination | 95 | 88 | 82 | 77 | 79 | — | — | — |
| | | $NH_3$— Selectivity | 5 | 5 | 3 | 4 | 3 | — | — | — |
| Comparison Example 2 | Cordierite | NO— Elimination | 97 | 85 | 78 | 73 | 69 | — | — | — |
| | | $NH_3$— | 6 | 4 | 3 | 3 | 3 | — | — | — |

Table 1-continued

| Example No. | Catalytic base material | Property (%) | Engine-running time (hr) | | | | | | | |
|---|---|---|---|---|---|---|---|---|---|---|
| | | | 5 | 50 | 100 | 200 | 300 | 500 | 700 | 830 |
| | | Selectivity | | | | | | | | |

Note:
*¹Elimination percentage of nitrogen monoxide
*²Selectivity percentage of ammonia

What we claim is:

1. A composite catalyst for clarifying exhaust gas containing nitrogen oxides, which comprises a catalytic ingredient comprising oxides of nickel and copper in an atomic ratio of nickel to copper of 1:0.05 through 1, and a catalytic base carrying said catalytic ingredient thereon and comprising a refractory inorganic material containing at least 50% by weight of zircon therein.

2. A composite catalyst as claimed in claim 1, wherein said refractory inorganic material consists essentially of zircon.

3. A composite catalyst as claimed in claim 1, wherein said catalytic base comprises at least 50% by weight of zircon and at most 50% by weight of a refractory inorganic material other than said zircon.

4. A composite catalyst as claimed in claim 3, wherein said refractory inorganic material is a refractory inorganic oxide material selected from the group consisting of cordierite, mullite, magnesia, alumina, silica-alumina, silica, zirconia, and mixtures of two or more of the above-mentioned materials.

5. A composite catalyst as claimed in claim 1, wherein said catalytic base comprises 70 to 90% by weight of zircon and the balance consisting of a refractory inorganic oxide material selected from the group consisting of cordierite, mullite, magnesia, silica-alumina, and mixtures of two of more of the above-mentioned materials.

6. A composite catalyst as claimed in claim 1, wherein said catalytic ingredient is in an amount of 4 through 50% by weight.

7. A composite catalyst as claimed in claim 1, wherein said composite catalyst is in a form of powder, grains, granules, pellets, tablets, monoliths, hollow blocks, porous lumps or honeycombs.

8. A method for producing a composite catalyst usable for clarifying exhaust gas containing nitrogen oxides, comprising depositing at least one nickel compound selected from the group consisting of salts and hydroxides of nickel and at least one copper compound selected from the group consisting of salts and hydroxides of copper, in an atomic ratio of nickel to copper of 1:0.05 through 1, onto a catalytic base comprising a refractory inorganic material containing at least 50% by weight of zircon therein, and converting said nickel and copper compounds into the corresponding oxides, respectively, by calcining them together with said catalytic base at a temperature of 400° to 1,000° C.

9. A method as claimed in claim 8, wherein said depositing is effected by impregnating said catalytic base with an aqueous solution containing said nickel compound and said copper compound, and drying said impregnated catalytic base with said aqueous solution.

10. A method as claimed in claim 8, wherein said calcining temperature is in a range of from 500° to 800° C.

11. A method as claimed in claim 8, wherein said depositing operation and said calcining operation for said nickel compound are carried out separately from those for said copper compound.

12. A method as claimed in claim 8, wherein said nickel salt is selected from the group consisting of carbonates, nitrates, sulfates, chlorides, formates, acetates, propionates, and oxalates of nickel.

13. A method as claimed in claim 8, wherein said copper salt is selected from the group consisting of carbonates, nitrates, sulfates, chlorides, formates, acetates, propionates, and oxalates of copper.

14. A method for producing a composite catalyst usable for clarifying exhaust gas containing nitrogen oxides, comprising mixing oxides of nickel and copper in the form of powder in an atomic ratio of nickel to copper of 1:0.05 through 1, with a catalytic base comprising a refractory inorganic material containing at least 50% by weight of zircon therein.

15. A method as claimed in claim 14, wherein said mixture is shaped and calcined at a temperature of 400° to 1,000° C.

* * * * *